(12) United States Patent
Madwed (10) Patent No.: US 6,478,099 B1
(45) Date of Patent: Nov. 12, 2002

(54) WHEELCHAIR WITH OFFSET DRIVE WHEELS

(76) Inventor: Albert Madwed, 110 Wedgewood Dr., Easton, CT (US) 06612

( * ) Notice: Subject to any disclaimer, the term of this patent is extended or adjusted under 35 U.S.C. 154(b) by 0 days.

(21) Appl. No.: 09/793,805

(22) Filed: Feb. 23, 2001

Related U.S. Application Data (60) Provisional application No. 60/184,298, filed on Feb. 23, 2000.

(51) Int. Cl.[7] ................................. B60K 1/02

(52) U.S. Cl. .................. 180/21; 180/65.5; 180/253

(58) Field of Search ................. 180/411, 65.5, 180/23, 24, 21, 252, 253

(56) References Cited

U.S. PATENT DOCUMENTS

| | | | | |
|---|---|---|---|---|
| 1,149,153 A | * | 8/1915 | Schleicher | 180/23 |
| 4,186,814 A | * | 2/1980 | Hart | 180/23 |
| 5,547,038 A | | 8/1996 | Madwed | |
| 5,609,220 A | * | 3/1997 | Moriya et al. | 180/253 |
| 5,699,873 A | * | 12/1997 | Moriya et al. | 180/14.1 |
| 6,109,379 A | * | 8/2000 | Madwed | 180/252 |
| 6,179,314 B1 | | 1/2001 | Jones | |
| 6,286,615 B1 | * | 9/2001 | Bitelli | 180/411 |

* cited by examiner

Primary Examiner—Kevin Hurley
(74) Attorney, Agent, or Firm—Cohen, Pontani, Lieberman & Pavane

(57) ABSTRACT

A wheeled chassis having separately and independently pivotable drivewheels attached to a generally rectangular frame. The axis of reorienting rotation of one of the drivewheels is offset relative to the reorienting axis of the other drivewheel to produce stable, controlled, and efficient multidirectional motion.

27 Claims, 12 Drawing Sheets

FIG. 1
PRIOR ART

STRAIGHT POSITION
FIG.2A1

ROTATION POSITION
FIG.2A2

FIG.2A
PRIOR ART

STRAIGHT POSITION
FIG.2B1

STRAIGHT LATERAL POSITION
FIG.2B2

FIG.2B
PRIOR ART

STRAIGHT POSITION
FIG. 2C1

90°  90°

STEERED LATERAL POSITION
FIG. 2C2

WHEELCHAIR WITH OFFSET DRIVE WHEELS

RELATED APPLICATIONS

This application claims priority from U.S. Provisional Patent Application Serial No. 60/184,298 which was filed on Feb. 23, 2000.

BACKGROUND OF THE INVENTION

1. Field of the Invention

The present invention relates to a motorized wheeled chassis having a pair of independently pivotable drivewheels and, in particular, to a motorized wheelchair having independently pivotable offset drivewheels, thus enabling true and efficient multidirectional travel.

2. Description of the Related Art

A conventional motorized wheelchair is typically equipped with a chassis having front wheels that consist of a pair of free-spinning castors and rear wheels that consist of a pair of motor-operated wheels which are fixed to the chassis and are frequently driven independently of one another by reversible, variable-speed DC motors. In such wheelchairs, the rotative direction and speed of each of the right and left motor-operated wheels are varied by reversing the power source connection of the appropriate DC drive motor and by regulating the input voltages to the motor, which actions result respectively in switching the direction of movement of the wheelchair (between forward and backward travel) and changing the speed (RPM) of movement of the wheelchair on or along an underlying ground surface. In this manner, a conventional motorized wheelchair is fairly easily advanced, retreated, turned to the right or to the left, and rotated in a stopped state.

However, such a conventional motorized wheelchair cannot be moved laterally with the rider remaining face forward because the motor-operated wheels cannot be pivoted so that they are directed sideways with respect to the rider. This restriction in movement interferes with the rider's ability to utilize the wheelchair completely, to move with total freedom of motion, and to perform certain functions that would be available only through lateral motion as, for example, painting on a horizontally-elongated surface or writing on a blackboard. Moreover, currently known drive wheel control arrangements further restrict the range of wheelchair movements in additional ways and may thereby limit a user's flexibility of motion along particular paths or directions of travel.

In order to solve the problems related to conventional motorized wheelchairs, the inventor of the invention described in this disclosure invented a "Wheeled Chassis Having Independently Pivotable Drivewheels for Omnidirectional Motion", described in U.S. Pat. No. 5,547,038 (hereinafter referred to as the '038 wheelchair), the entire disclosure of which is incorporated herein by reference. The '038 wheelchair not only allows the rider to face forward while moving laterally, but also provides a minimal turn radius for rotating while remaining in one location.

Figure 1:
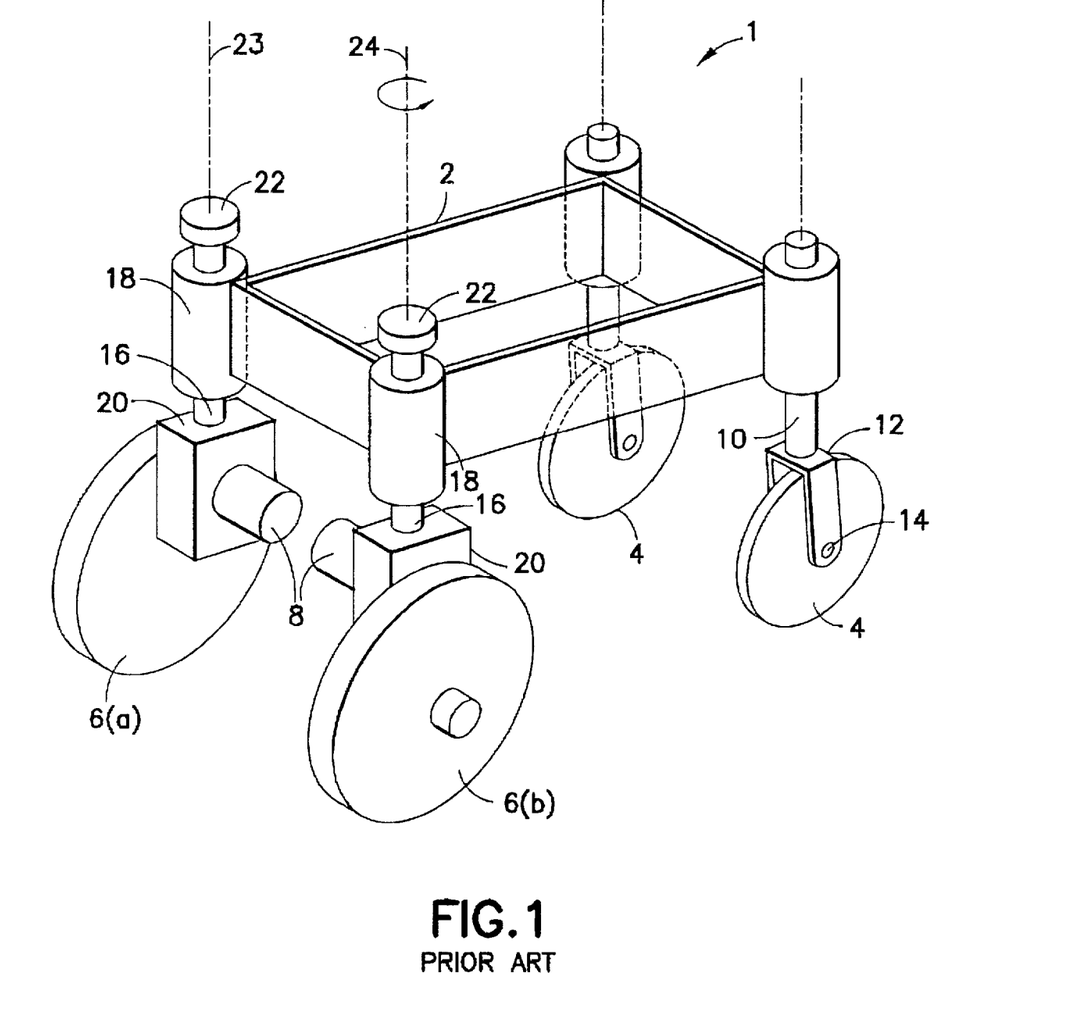
FIG. 1 is an elevated perspective view of the frame, wheels, and drive assemblies of a wheeled chassis constructed according to the prior art.

As shown in FIG. 1, the chassis 1 of the '038 wheelchair has a generally rectangular frame 2 with four wheels, one disposed in each corner. In what shall be referred to as the front of the chassis 1, two wheels, each labeled 4, are attached to the frame 2 by a shaft 10 that extends along an axis defined generally normal or perpendicular to the ground surface and each links to a bearing assembly 12. Assembly 12, at its lower portion, connects to a hub 14 of wheel 4. By this construction, two independently pivoting, free-spinning wheels 4 are positioned at the front of chassis 1.

The two wheels at the rear of chassis 1 are the left drivewheel 6(a) and the right drivewheel 6(b). Each drivewheel 6 is attached by a kingpin 16 to frame 2. Each kingpin 16 at its upward end passes through a channel 18 in frame 2 containing a bearing assembly to provide freedom of selectively controlled pivotal rotation about an axis defined substantially normal to the supporting ground surface. The top end of each kingpin 16 protrudes beyond the top surface of frame 2 and has rigidly connected thereto a drive gear 22 for engagement with a rotative mechanism (not shown). Thus, drivewheel 6(a) may pivotally rotate around substantially vertical axis 23 and drivewheel 6(b) may pivotally rotate around a substantially vertical axis 24.

The lower portion of each kingpin 16 is rigidly attached to a drivewheel assembly 20 which comprises a variable speed, bidirectional drive motor 8 that rotatably drives the respective drivewheel 6 in a forward or reverse direction. There is no linkage or attachment of the two separate motor drives 8, and coordination between the two is implemented by a control system (not shown).

Figure 2A:
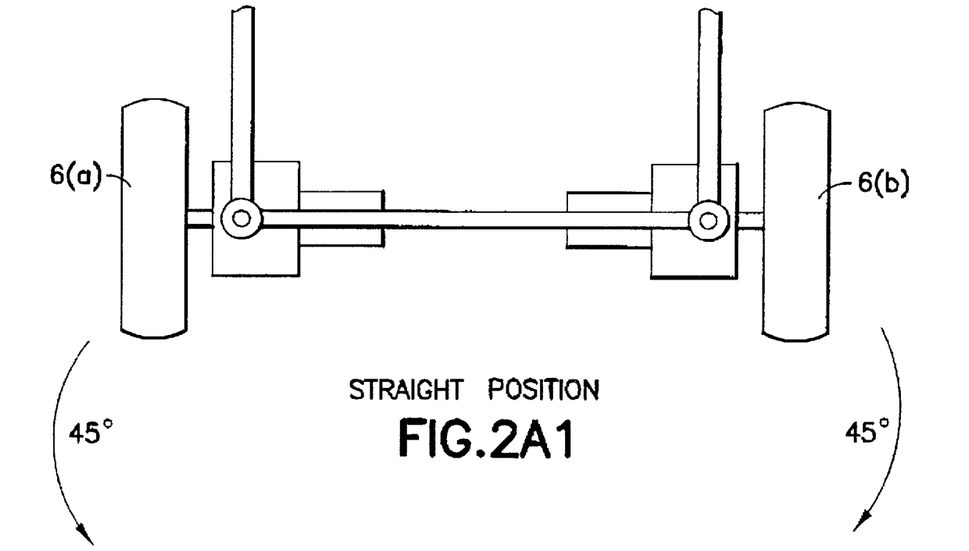
Figures 2A, 2A:
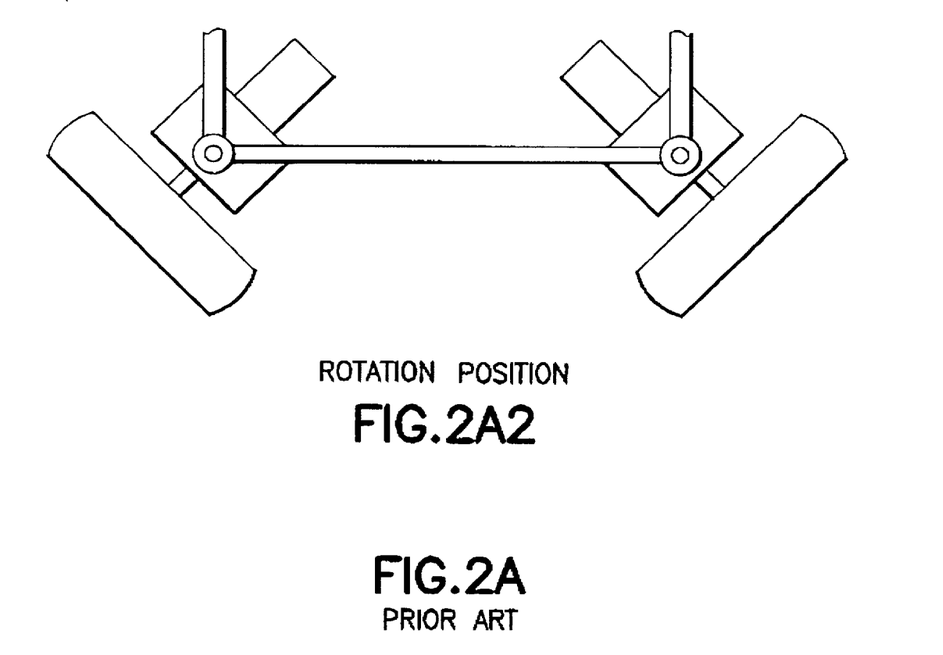
Figures 2B, 2B, 2B:
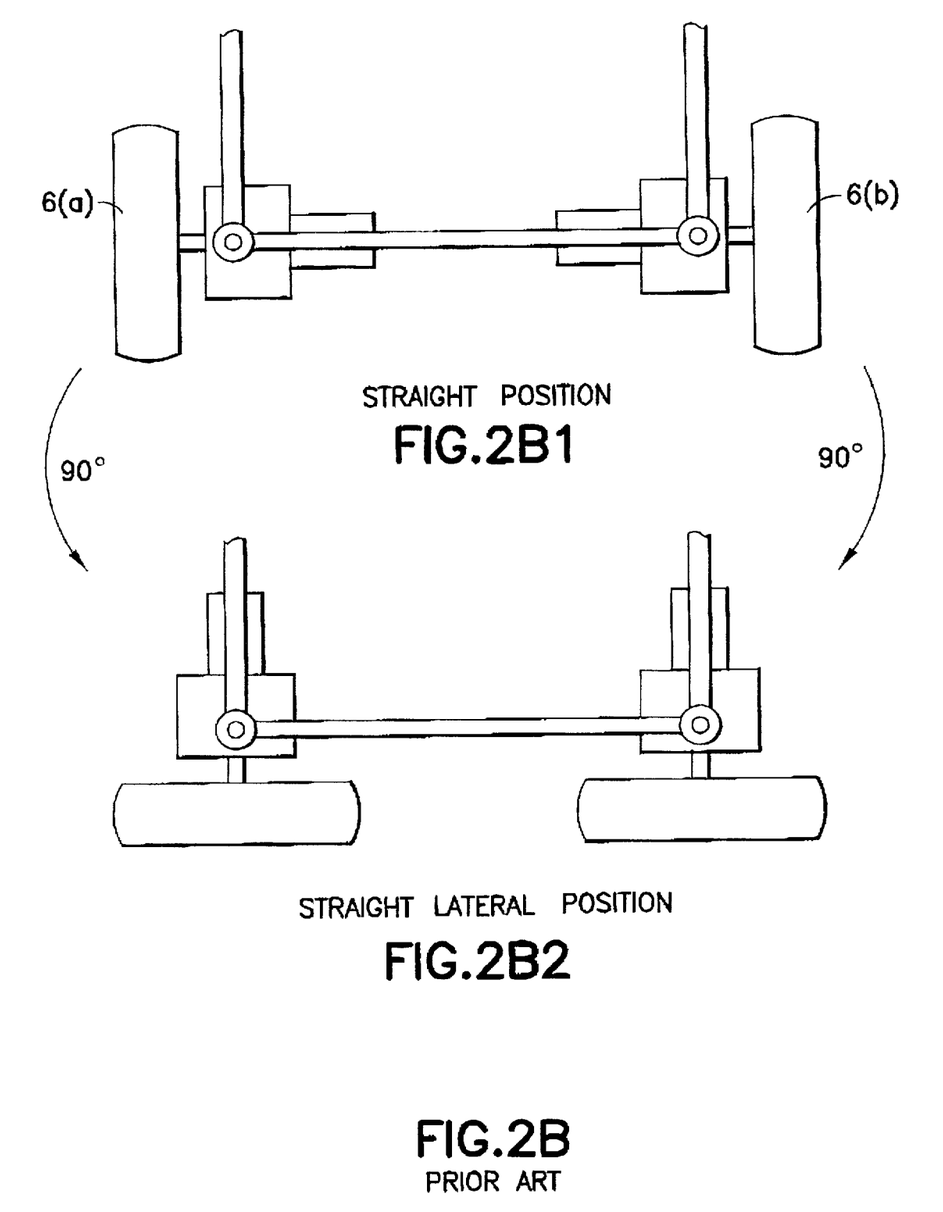
Figures 2C, 2C, 2C:
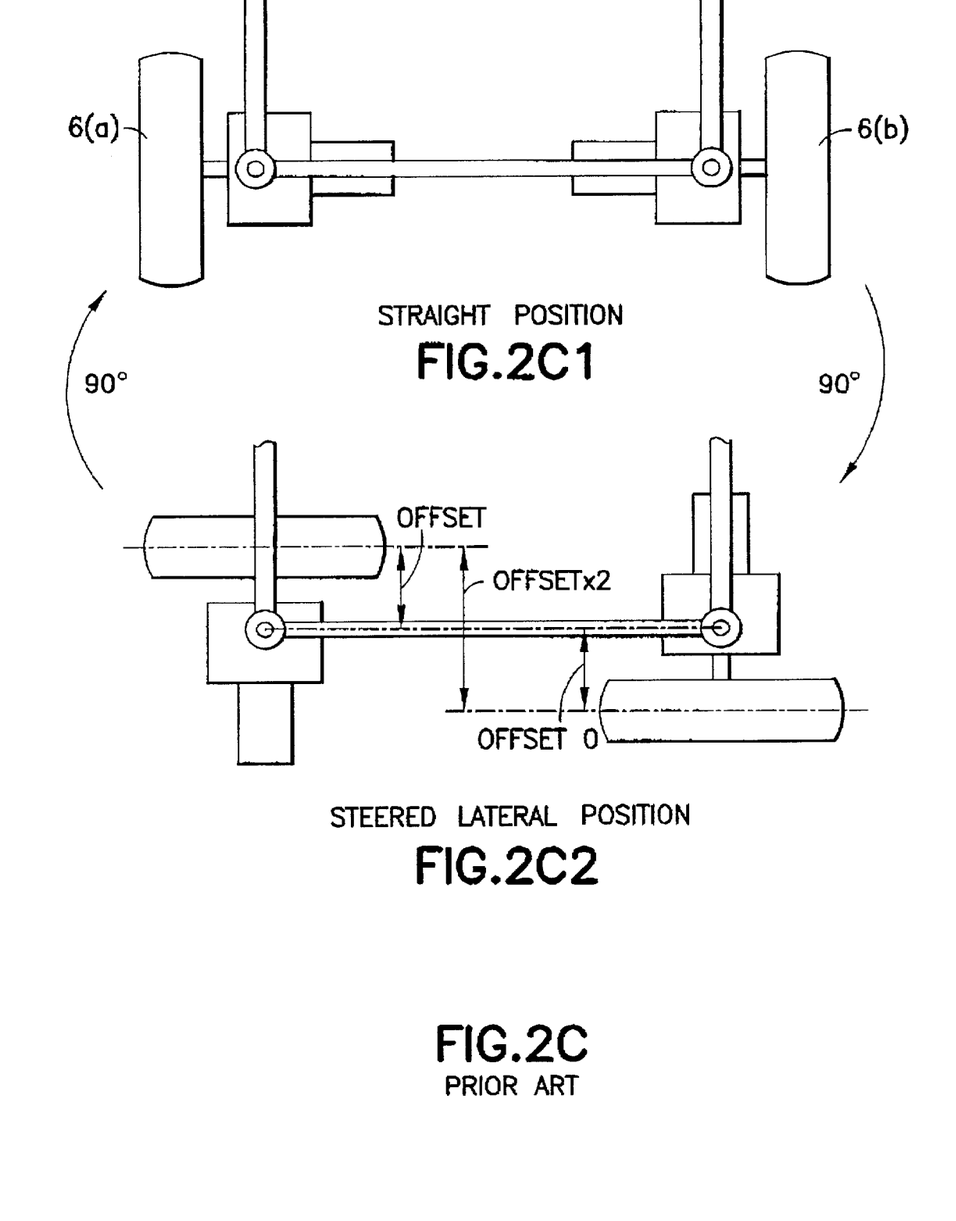

With the construction shown in FIG. 1, each drivewheel 6 is capable of being pivotally rotated in a complete 360° circle without interference or impediment. Some of the varieties of motion possible with such a construction are shown in FIGS. 2A–2C. In FIG. 2A, the two rear drivewheels 6 are shown in two different positions (FIG. 2A1 and 2A2). In FIG. 2A1, the drivewheels 6 are in a straight (0°) position allowing the wheelchair to be moved straight forward or straight backward. In FIG. 2A2, the two drivewheels 6 are positioned for a minimum radius turning circle. To get to the minimum circle position from the straight position, the right drivewheel 6(b) rotates 45° clockwise and the left drivewheel 6(a) rotates 45° counter-clockwise. In this rotated position, the wheelchair can turn or rotate in place.

It should be noted that the 45° rotation position only applies to a wheeled chassis with a square frame, i.e. with equal length and width, or in which the wheels are mounted at equal front-to-back and side-to-side distances apart. In general, the wheel position for rotation is perpendicular to the diagonal of the chassis frame. As an example, the angle of the rotation position for a frame whose length is longer than its width would be more than 45°. Hereinbelow, although the specification discusses rotation angles such as 45°, 90°, etc., it should be understood that 45°, 90°, etc. are only exemplary rotation angles that are appropriate for a square frame, and the present invention applies to any roughly rectangular frame where the appropriate rotation angles for the different positions may not be 45°, 90°, etc.

In FIG. 2B1 the straight position is shown again, while FIG. 2B2 shows the straight lateral position which allows the wheelchair to travel straight sideways to the right or the left while the rider remains facing forward. To get to the straight lateral position from the straight position, the right drivewheel 6(a) rotates 90° clockwise and the left drivewheel 6(b) rotates 90° counterclockwise. FIG. 2C1 shows the straight position, while FIG. 2C2 shows the steered lateral position which allows the wheelchair to travel sideways to the right or left while being controllably steered to alter its course in that direction. To get to the straight lateral position from the straight position, the right drivewheel 6(a) rotates 90° clockwise and the left drivewheel 6(b) rotates 90° clockwise.

In using the prior art '038 wheelchair, use of the straight lateral position shown at FIG. 2B2 can become difficult to control once the wheelchair is in straight horizontal motion. This lack of control necessitates that only the steered lateral position shown at FIG. 2C2 is used for both straight and curved horizontal movement.

Figure 3A:
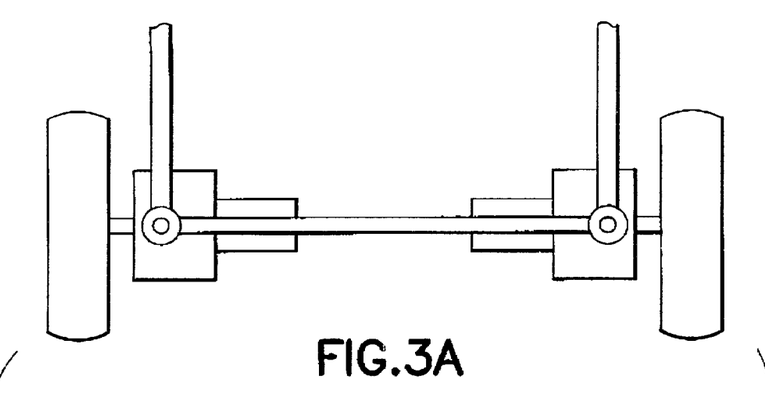
Figure 3B:
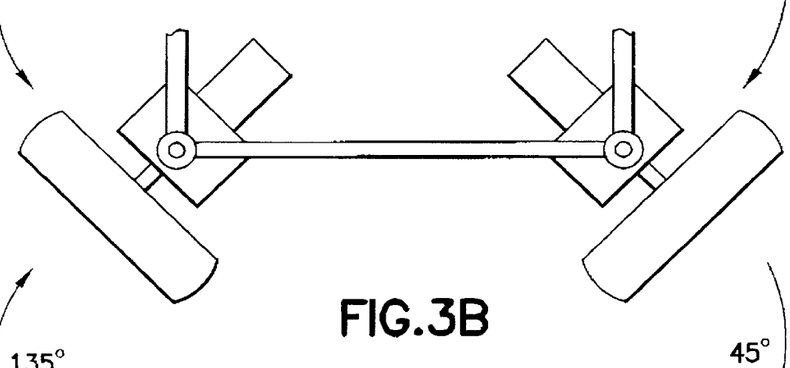
Figure 3C:
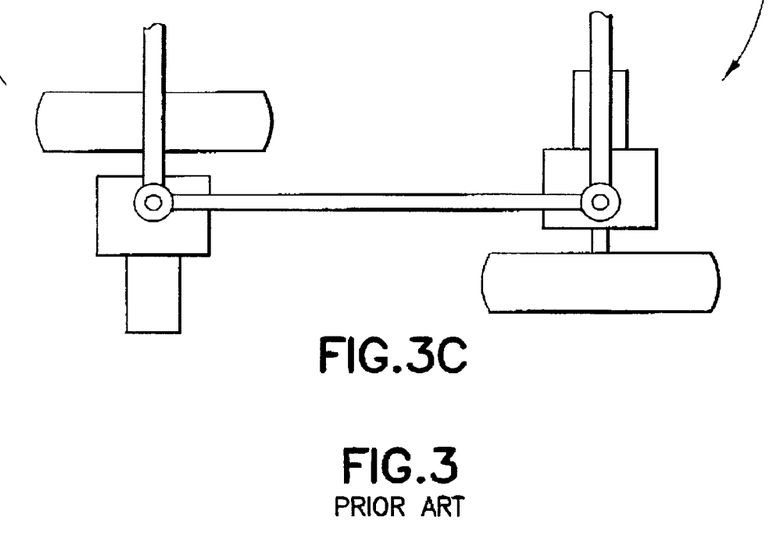

However, this simplification of using only three essential positions—straight, rotation, and (steered) lateral—makes certain common sequences of wheelchair movements unwieldy and particularly wasteful of limited battery power. For example, as shown in FIGS. 3A–3C, a wheelchair may be traveling straight (FIG. 3A), rotate to face another direction (FIG. 3B), and then move laterally to the right or left (FIG. 3C). In this sequence of movements, the right drivewheel 6(b) first rotates 45° clockwise and then rotates an additional 45° clockwise. However, the left drivewheel 6(b) first rotates 45' counter-clockwise and then rotates a full 135° clockwise to reach the lateral position. This sudden change in rotation direction (from counter-clockwise to clockwise) as well as the large required change in rotation angle (135°) makes difficult the implementation of a simple economical rotation system because of the constant additional drain on battery power.

Accordingly, there is a need for a wheelchair chassis with drivewheels that do not require a sudden change in rotation direction or a large change in rotation angle when performing common sequences of movements.

SUMMARY OF THE INVENTION

Accordingly, it is an object of the present invention to provide a wheeled chassis having independently operable drivewheels that permit true and efficient multidirectional motion of the chassis on and along a ground surface.

It is a further object of the invention to provide a wheeled chassis with drivewheels that do not require a sudden change in rotation direction when performing common sequences of movements.

It is another object of the invention to provide a wheeled chassis with drivewheels that do not require a large change in rotation angle when performing common sequences of movements.

It is still another object of the invention to provide linkage and shifting systems for the drivewheels of a wheeled chassis.

The foregoing and other objects and advantageous features of the instant invention are achieved by the provision of a wheeled chassis having independently pivotable drivewheels for multidirectional motion attached to a generally rectangular frame. The axis of rotation for one or more drivewheels is offset from the corner of the generally rectangular frame of the wheeled chassis, and the offset thus created produces stable, controlled, and efficient multidirectional motion.

One preferred embodiment of the present invention comprises a substantially rectangular frame having front, rear, first, and second sides; at least one free-spinning wheel rotatably attached proximate to the front side of the frame; a rear drivewheel attached at a location on the first side of the frame by a kingpin which is secured in a vertical channel located at the first side location and has a substantially vertical axis about which the rear drivewheel may rotate; and an offset drivewheel attached at a location on the second side of the frame by a kingpin which is secured in a vertical channel located at the second side location and has a substantially vertical axis about which the offset drivewheel may rotate. The distance of the second side location from the front side of the frame is less than the distance of the first side location from the front side of the frame and the difference between said second and first side distances is the offset distance. The rear and offset drivewheels determine the direction of movement of the wheeled chassis and the offset distance between the drivewheels provides stability, control and efficiency to the movements of the wheeled chassis.

Another preferred embodiment of the present invention comprises a substantially rectangular frame having a front, rear, first, and second side; at least one free-spinning wheel rotatably attached proximate to the rear side of the frame; a wheeled support means attached proximate to the front side of the frame; a first drivewheel attached to a first offset location located on the first side a first offset distance away from the corner of the first and rear sides of said frame, where the first drivewheel is connected to the frame by a kingpin which is secured in a vertical channel located in the first offset location and has a substantially vertical axis about which the first drivewheel may rotate; a second drivewheel attached to a second offset location located on the second side a second offset distance away from the corner of the second and rear sides of said frame, where the second drivewheel is connected to the frame by a kingpin which is secured in a vertical channel located in the second offset location and has a substantially vertical axis about which the second drivewheel may rotate.

Inventive exemplary shifting systems for rotating the drivewheels into preferred positions for travel are also described.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

In the drawings, wherein the reference numerals denote similar elements throughout the several views:

FIGS. 2A are top plan operational views of the rear drivewheels of the wheeled chassis of FIG. 1 in the straight (FIG. 2A1) and rotation positions (FIG. 2A2);

FIGS. 2B are top plan operational views of the rear drivewheels of the wheeled chassis of FIG. 1 in the straight (FIG. 2B1) and straight lateral positions (FIG. 2B2);

FIGS. 2C are top plan operational views of the rear drivewheels of the wheeled chassis of FIG. 1 in the straight (FIG. 2C1) and steered lateral positions (FIG. 2C2);

FIGS. 3 are top plan operational views of the rear drivewheels of the wheeled chassis of FIG. 1 when moving from the straight position (FIG. 3A), to the rotation position (FIG. 3B), and then to the lateral position (FIG. 3C);

FIGS. 5 are top plan operational views of the rear drivewheels of the wheeled chassis of FIG. 4 when moving from the straight position (FIG. 5A), to the rotation position (FIG. 5B), and then to the lateral position (FIG. 5C);

FIGS. 6 are top plan operational views of a linkage system as it orients the rear drivewheels of the wheeled chassis of FIG. 4 when moving from the straight position (FIG. 6A), to the rotation position (FIG. 6B), and then to the lateral position (FIG. 6C);

FIGS. 7B are top plan operational views of a linkage system as it orients the rear drivewheels of the wheeled chassis of FIG. 4 when moving from the straight position (FIG. 7B1), to the rotation position (FIG. 7B2), and then to the lateral position (FIG. 7B3);

FIGS. 9 are top plan operational views of a linkage system as it orients the centrally placed drivewheels of the wheeled chassis of FIG. 8 when moving from the straight position (FIG. 9A) to the lateral position (FIG. 9B).

DETAILED DESCRIPTION OF THE CURRENTLY PREFERRED EMBODIMENTS

In the preferred embodiments, the axis of one or more drivewheels is offset from its respective corner, thus making common sequences of movements easier and more efficient. Although the chassis frame shown in the preferred embodiments is generally rectangular, other shapes may be used when implementing the present invention. Furthermore, although one of the preferred embodiments offsets the right drivewheel of the wheeled chassis, it is also possible to offset the left drivewheel instead. Indeed, the cardinal directions (front, back, left, right) in the embodiments may be reversed or otherwise changed while still implementing the invention, as will be apparent to those skilled in the art upon reading and understanding this specification.

Those skilled in the art will also be able to select the proper materials for the frame and other portions of the chassis which can include, by way of example, steel, hard plastics, and wood, depending on the particular structure and application involved. Exemplary and novel linkage and shifting systems are shown and described in the present specification, but the invention is in no way limited to those exemplary linkage/shifting systems, and other systems may be used when practicing the invention. Furthermore, although the wheeled chassis in the currently-preferred embodiments is generally intended for a wheelchair, the wheeled chassis according to the invention may have other uses, such as the frame for a cart or basket. Many embodiments are possible when implementing the invention, but only a few exemplary embodiments will be discussed below.

Figure 4:
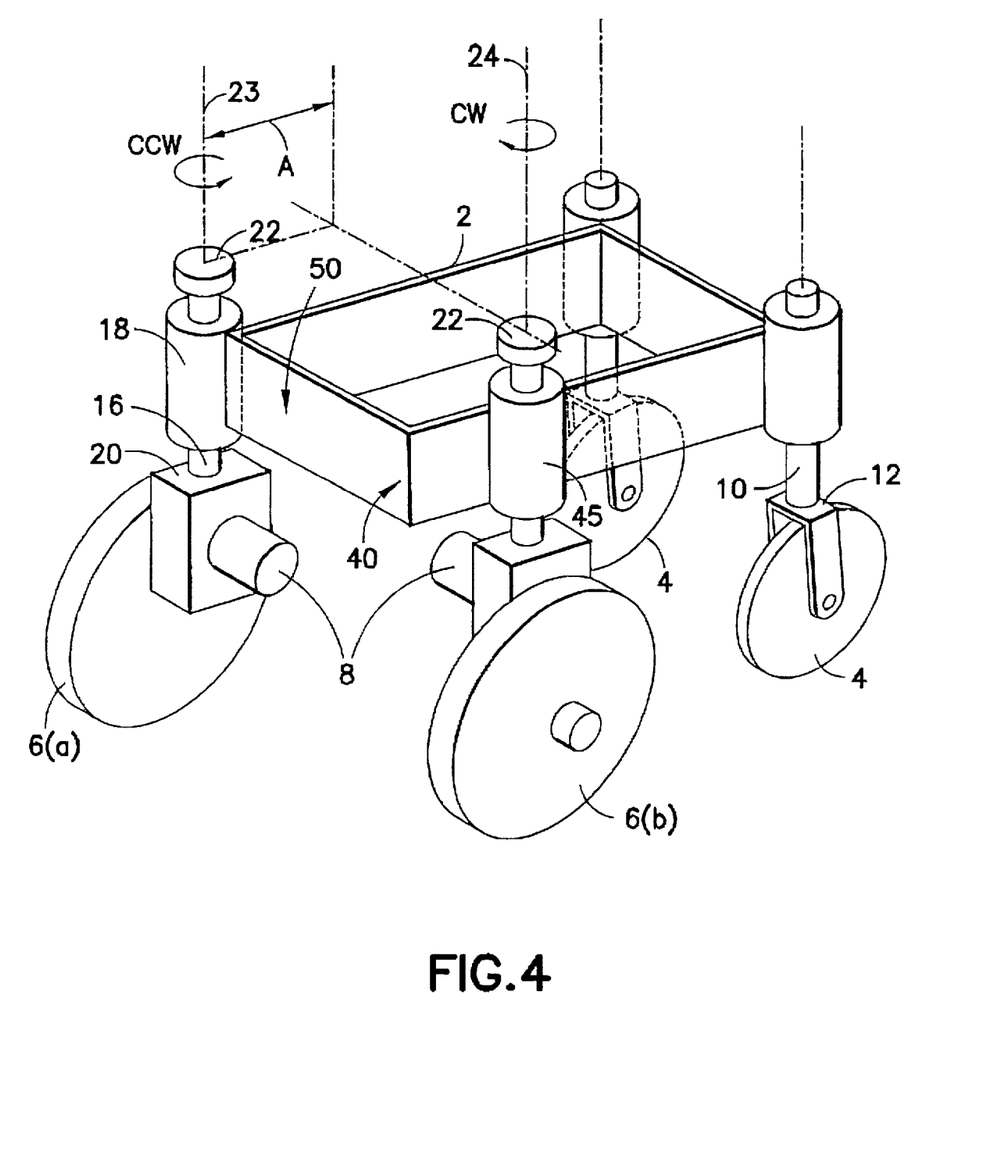
FIG. 4 is an elevated perspective view of the frame, wheels, and drive assemblies of a wheeled chassis constructed according to a preferred embodiment of the present invention.

In FIG. 4, a wheeled chassis is shown in accordance with a preferred embodiment of the instant invention. Although the front independently pivoting free-spinning wheels 4 are constructed and positioned similarly to the front wheels 4 in FIG. 1, the rear drivewheels 6 in FIG. 4 are relatively offset one from the other by a distance A. The left drivewheel 6(a) is constructed and positioned similarly to the left drivewheel 6(a) of FIG. 1, with its kingpin 16 held in a channel 18 in the rear left corner of frame 2. The channel 18 holding kingpin 16 of right drivewheel 6(b), instead of being located at rear right corner 40 of frame 2 (as is channel 18 of drivewheel 6(b) in FIG. 1), is located a distance A away from corner 40 at position 45. This results in the substantially vertical axis 24 of offset drivewheel 6(b) being parallel to but offset, by a distance A, from substantially vertical axis 23 of left drivewheel 6(a) along the front to back direction or axis of the frame 2. In another embodiment of the invention, left drivewheel 6(a) may be located a distance B forward from the rear left corner, as long as the offset distance A is maintained between the two drivewheels. Those skilled in the art will recognize that, in such an embodiment, the only limit on the distance between the channel 18 of left drivewheel 6(a) and the rear left corner is the stability of the wheeled chassis for its intended use.

Figure 5A:
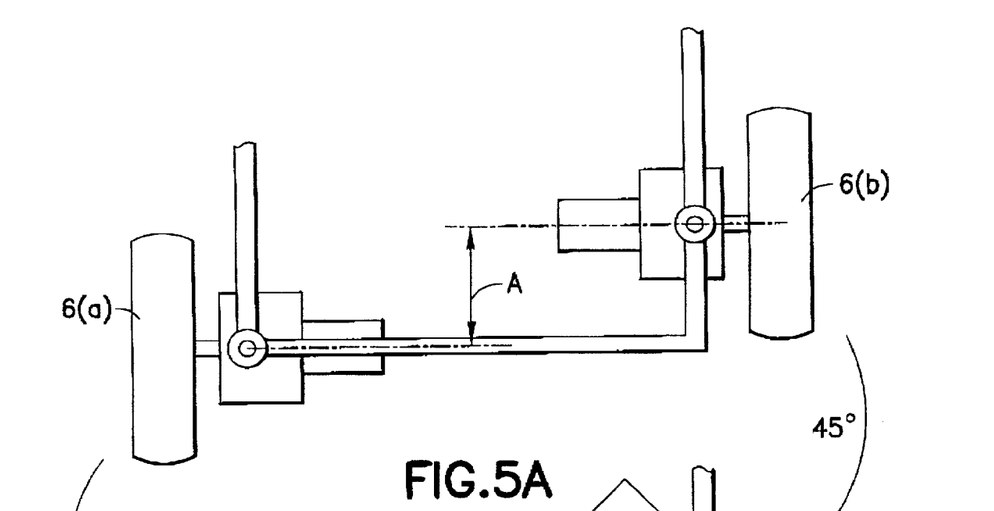
Figure 5B:
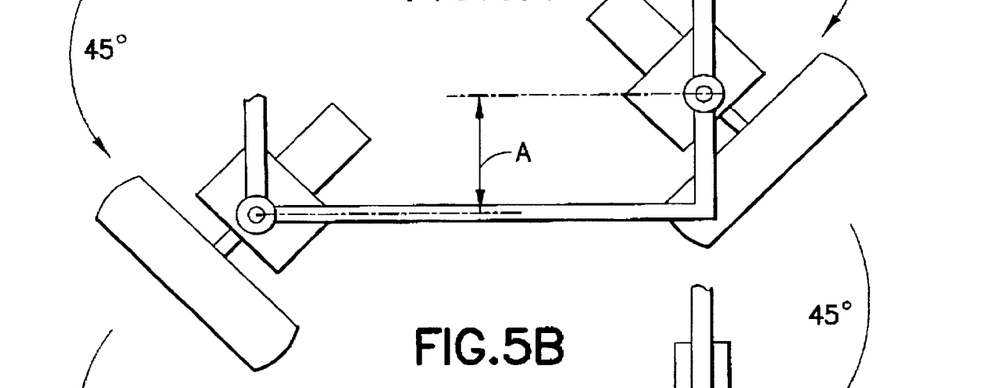
Figure 5C:
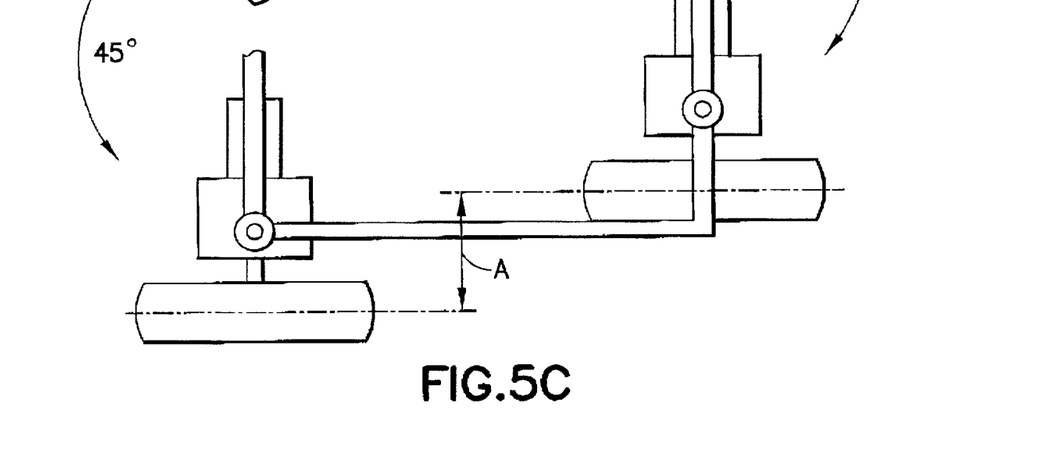

Because of the offset placement of channel 18 holding kingpin 16 of drivewheel 6(b), the problems encountered in the series of movements demonstrated in FIGS. 3A–3C no longer exist. As shown in FIGS. 5A–5C, moving from the straight position (FIG. 5A) to the rotation position (FIG. 5B) involves the same movements as those shown in FIGS. 3A–3C; namely, the right drivewheel 6(b) rotates 45° clockwise and the left drivewheel 6(b) rotates 45' counterclockwise. However, when moving from rotation position (FIG. 5B) to lateral position (FIG. 5C), the movements of the preferred embodiment are minimal in comparison to the movements of the '038 wheelchair. Specifically, the left drivewheel 6(a) in the preferred embodiment only needs to move an additional 45° counter-clockwise to attain the lateral position. By contrast, the left drivewheel 6(a) of the prior art '038 wheelchair has to move 135° clockwise from the rotation position to reach the lateral position, as shown in FIGS. 3A–3C. Furthermore, as seen in FIGS. 5A–5C, the left drivewheel 6(a) in the preferred embodiment rotates in the same direction, counter-clockwise, when moving from rotation position (FIG. 5B) to lateral position (FIG. 5C) as the previous movement into lateral position (FIG. 5B) from straight position (FIG. 5A). In contrast, the left drivewheel 6(a) of the prior art '038 wheelchair has to change directions from counter-clockwise (when moving from the straight position of FIG. 3A to the rotation position of FIG. 3B) to clockwise (when moving from the rotation position of FIG. 3B to the lateral position of FIG. 3C).

Comparison of the movements of the prior art '038 wheelchair shown in FIGS. 3A–3C with the movements of the preferred embodiment of FIG. 4 as shown in FIGS. 5A–5C demonstrates the advantages of the inventive construction. Because the FIG. 4 chassis does not require a sudden change in wheel rotation direction or a large change in wheel rotation angle when performing common sequences of movements, the battery life of the wheelchair is extended. In the long term, because of the reduced wear and tear, the product life of the left drivewheel assembly is also extended.

Figure 6A:
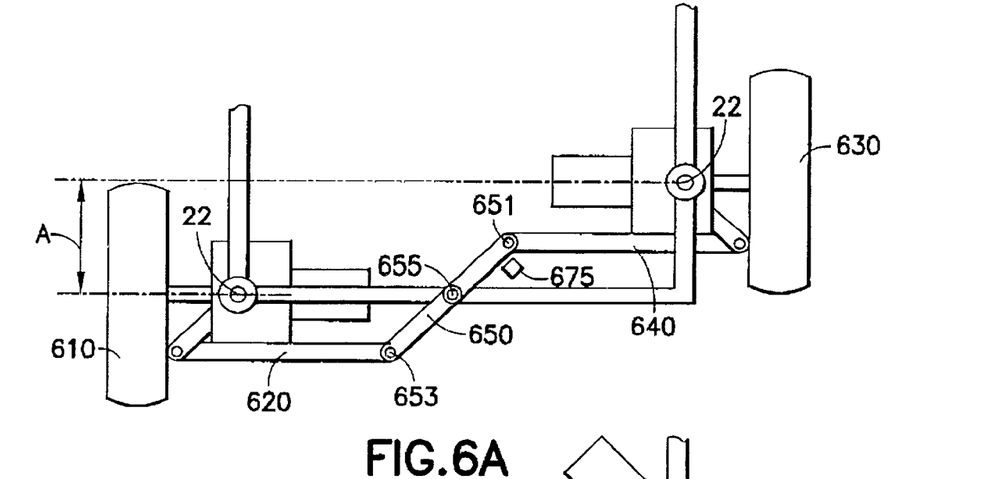
Figure 6B:
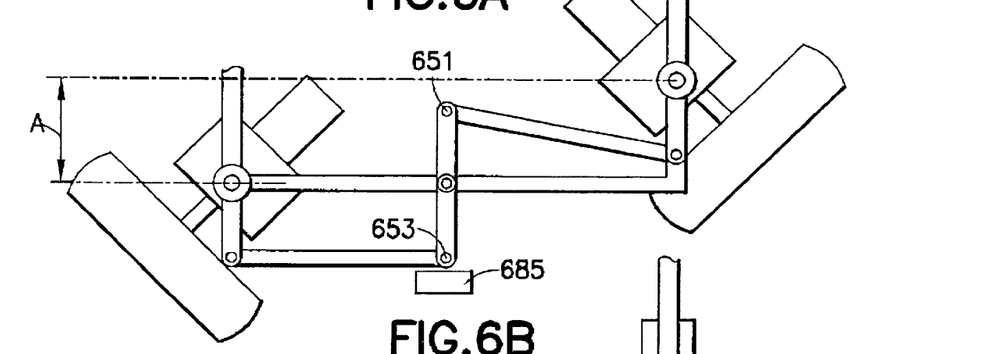
Figure 6C:
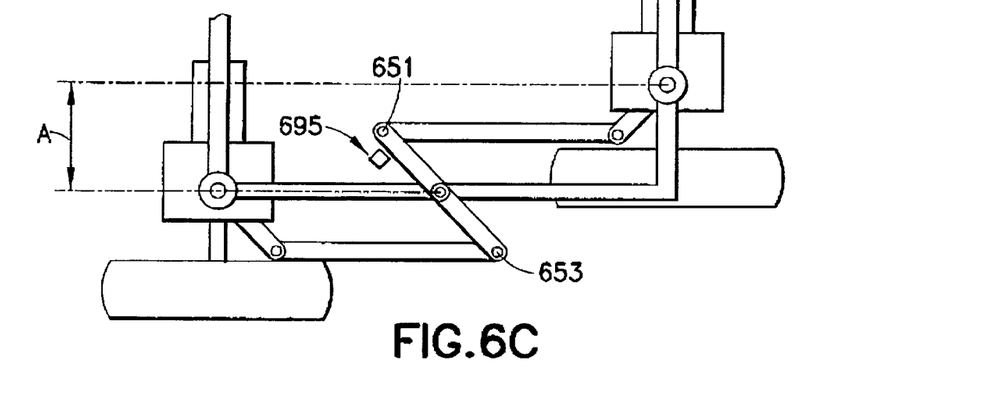

A linkage system for orienting the drivewheels 6 of the FIG. 4 embodiment is shown in FIGS. 6A–6C. As there depicted, five links form the linkage system: left drive gear link 610, left transverse link 620, right drive gear link 630, right transverse link 640, and control link 650. The drive gear links 610/630 have a mounted end and a pivoting end. The mounted end of each drive gear link 610/630 is securely connected with a drive gear 22 of a drivewheel 6. Because of this secure connection, movement of the drive gear links causes the drive gears 22 and, thus, the attached kingpins 16, to pivotally rotate around axis 23 or 24. Such rotation causes each drivewheel assembly to rotate and to move into different positions.

The pivoting end of each drive gear link 610/630 is pivotably connected to the outside end of each transverse link 620/640. The inside end of each transverse link 620/640 is pivotably connected to an end of control link 650: right transverse link 640 to the right drivewheel end 651 of control link 650, and left transverse link 620 to the left drivewheel end 653 of control link 650. The center 655 of control link 650 is pivotably mounted to the rear end 50 of frame 2. The entire linkage system is only connected to the wheelchair at 3 points: the center 655 of the control link 650, and the secured ends of the drive gear links 610/630. When control link 650 pivotally rotates around its center point 655, the movement is imparted to transverse links 620/640 which 152 move drive gear links 610/630 which, in turn, move the drivewheels 6 into different positions. Examples of this movement will be described below with reference to FIGS. 6A–6C.

When the drivewheels 6 are in the straight position, as shown in FIG. 6A, control link 650 has its right drivewheel end 651 tilted toward the right drivewheel 6(b) and the left drivewheel end 653 tilted toward the left drivewheel 6(a). In order to move into the rotation position, as shown in FIG. 6B, the control link 650 is rotated about its center 655 such that the right drivewheel end 651 moves away from right drivewheel 6(b) and the left drivewheel end 653 moves away from left drivewheel 6(a). In the rotation position (FIG. 6B), control link 650 is perpendicular with the rear 50 of frame 2. Finally, in order to move into lateral position 690, control link 650 is rotated still further, in the same direction, such that the right drivewheel end 651 moves further away from right drivewheel 6(b) and the left drivewheel end 653 moves further away from left drivewheel 6(a). The drivewheels may return to the rotation position (FIG. 6B) or straight position (FIG. 6A) by rotating control link 650 in the other or opposite direction.

In the preferred embodiment, power is applied to a motor or actuator which rotates control link 650 about its center point or axis 655, thus moving drivewheels 6 into different positions. At the straight position (FIG. 6A) and the lateral position 690, stops 675 and 695, respectively, are located so as or to stop control link 650 from further rotation in either direction. These mechanical stops 675/695 may also terminate or cause the termination of the supply of operating power to the motor or actuator which rotates control link 650. At the rotation position (FIG. 6B), suitable provision of a mechanical switch 685 may be employed to halt operation of the motor or actuator when control link 650 attains the exact position required.

The linkage system in FIG. 6 may also be controlled manually. In another embodiment, a manual shifting system, similar to the one that will be described with reference to FIG. 7 below, is used as a back-up for the power system. If the power shifting system were to fail, the user can unlock or decouple the power shifting system and use a shifting arm to manually shift the wheels into different positions.

Figure 7A:
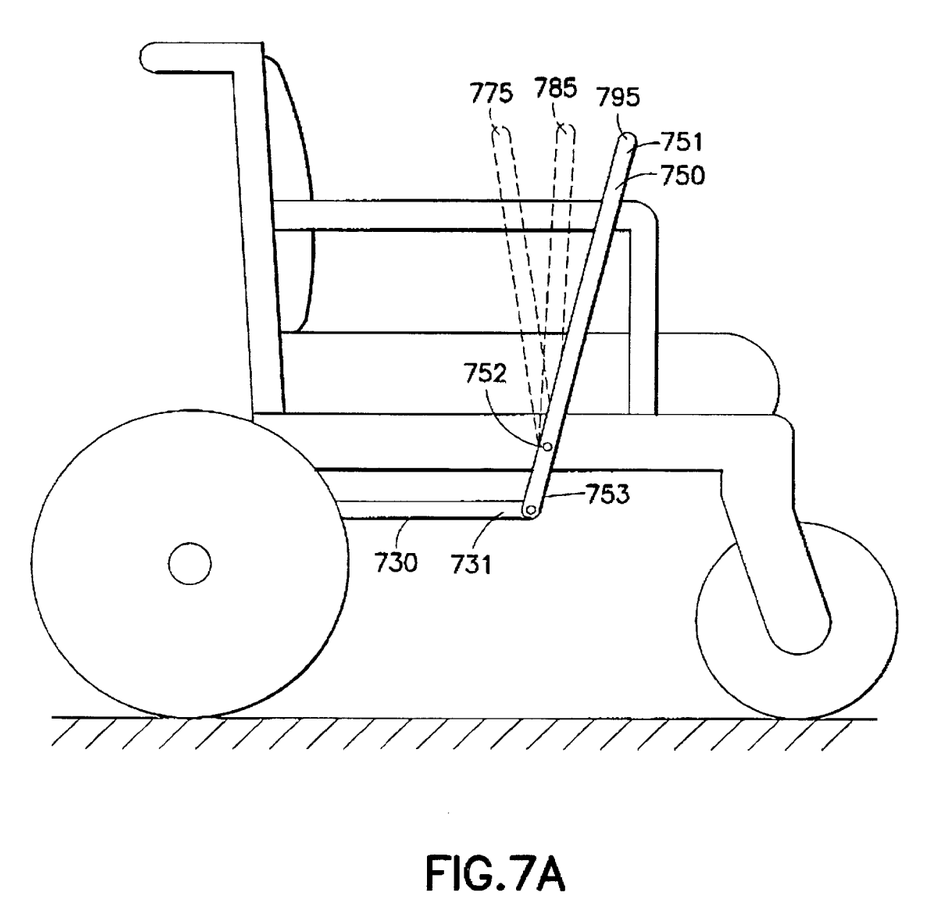
FIG. 7A is a side plan operational view of a wheelchair with the linkage system of FIG. 7A, showing the different shift positions of the manual shift lever as it shifts the linkage system of FIG. 7A from the straight position, to the rotation position, and then to the lateral position.

Another linkage system for orienting the drivewheels 6 of the preferred embodiment of FIG. 4 is shown in FIGS. 7A and 7B. This linkage system as shown is manually operated, although it need not be. In fact, as mentioned above with reference to FIG. 6, the manual linkage system of FIGS. 7A and 7B could be used as the back-up system for a power shifting system.

In FIGS. 7A and 7B, a transverse link 710, a connecting link 730, and a shifting arm 750 form the linkage system. Each end of transverse link 710 is pivotably connected to a corner of a drivewheel assembly 20. One of the drivewheel assemblies 20 is attached by connecting link 730 to shifting arm 750. When shifting arm 750 moves connecting link 730, the attached drivewheel assembly 20 is moved, and the connected transverse link 710 is moved, thus causing the other drivewheel assembly connected at the other end of transverse link 710 to move as well. In this manner, and using this linkage arrangement, an operator can move drivewheels 6 into different positions through selective movement of shifting arm 750.

As shown in FIG. 7A, shifting arm 750 has a free end 751 and a connected end 753 and is pivotably connected to the wheelchair chassis frame at 752. The rider can grasp the free end 751 of arm 750 and rotate arm 750 around connection point 752. The connected end 753 of arm 750 is pivotably connected to connecting link 730. When free end 751 is pushed forward the connected end 753 shifts rearward, thus likewise forcing connecting link 730 rearward. Any suitable system, such as notch and detent, may be deployed for retaining the shifting arm 750 at one of the three angles that place the drivewheels 6 in the respective straight, rotation and lateral positions.

The connecting link 730 is pivotably connected at one end 731 to shifting arm 750, as shown in FIG. 7A, and at the other end 733 to drive assembly 20(b) of the right drivewheel 6(b), as shown in FIGS. 7B1–7B3. Although both are pivoted connections, the planes of pivot are perpendicular to each other; the connection at end 731 pivots in a vertical plane parallel to the sides of the chassis-carried wheelchair, whereas the connection at end 733 pivots in a horizontal plane parallel to the supporting ground surface.

The linkage system of FIGS. 7 will now be described with specific reference to FIGS. 7B1–7B3, using the following nomenclature: the "front" and "back" of the drivewheel assembly 20 are these portions facing front and back, respectively, when the drivewheels 6 are in the straight position. End 733 of connecting link 730 is pivotably connected to a small extension 741 on the right front corner of drive assembly 20(b) on right drivewheel 6(b). On the right rear corner of drive assembly 20(b), another small extension 743 is pivotably connected to the right end 711 of transverse link 710. The left end 713 of transverse link 710 is pivotably connected to a small extension 745 on the right front corner of drive assembly 20(a).

Figure 7B:
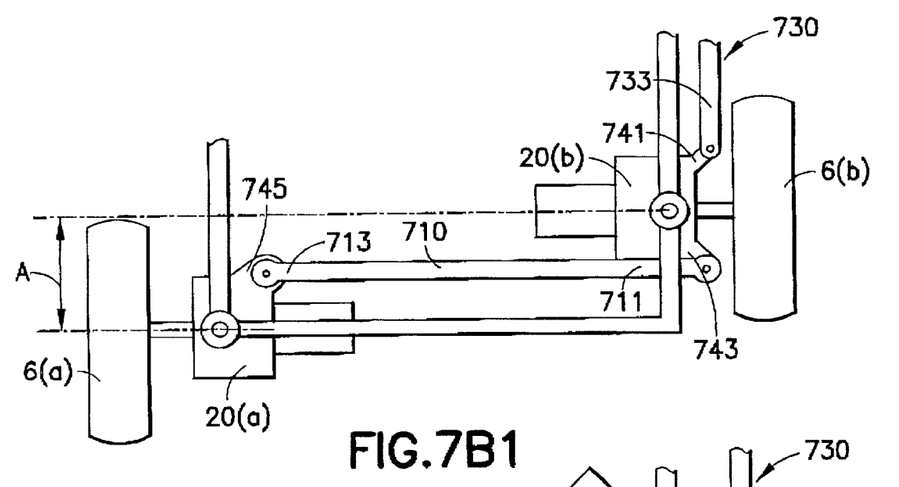
Figure 7B:
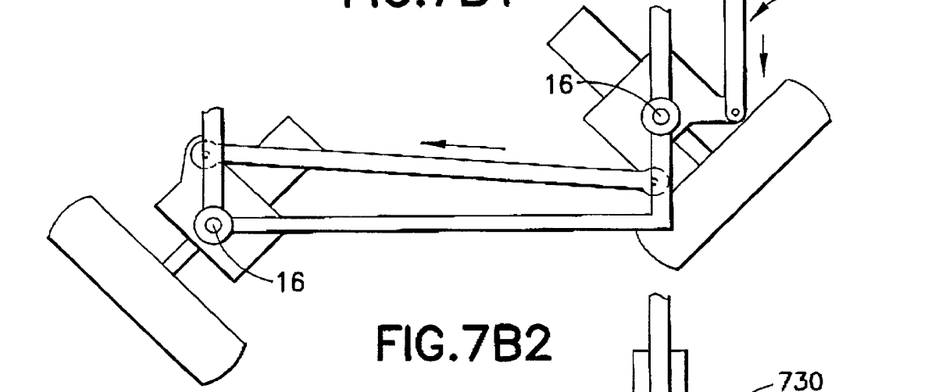

When the drivewheels 6 are in the straight position, as shown in FIG. 7B1, shift arm 750 is in position 775 in FIG. 7A. To move drivewheels 6 to the rotation position shown in FIG. 7B2, the free end 751 of shift arm 750 is pushed forward to position 785. This forward advancement of the free end 751 results in rearward movement of the connected end 753 of connecting link 730 which, in turn, forces extension 741 of drive assembly 6(b) rearward. Drive assembly 20(b) is thus rotated about substantially vertical axis 24 of kingpin 16, moving the right drivewheel 6(b) into the proper 45° rotative position. At the same time, transverse link 710 is pushed to the left by the rotating movement of drive assembly 20(b), by which transverse link 710 pushes extension 745 of drive assembly 20(a) to the left. Drive assembly 20(a) is thus rotated about substantially vertical axis 23 of kingpin 16, moving left drive wheel 6(a) into the proper 45° rotative position.

Figure 7B:
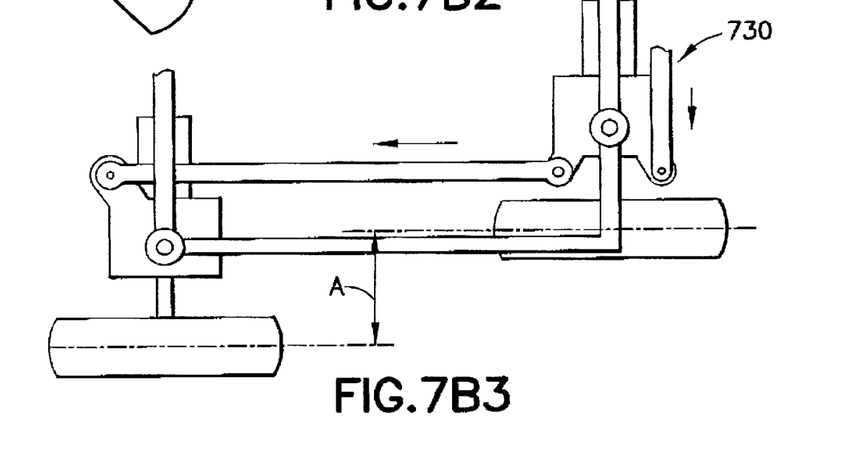

To move the drivewheels 6 to the lateral position as shown in FIG. 7B3, the free end 751 of shift arm 750 is advanced further forward to position 795. This results in the same series of movements described above, but to a greater rotative extent. In the end, drive assembly 20(b) is further rotated about substantially vertical axis 24, bringing right drivewheel 6(b) to the proper 90° rotative position. Similarly, drive assembly 20(a) is further rotated about substantially vertical axis 23, bringing left drivewheel 6(*a*) to the proper 90° rotative position.

In an embodiment in which the manual linkage system just described is provided as a back-up for the power shifting system, a linear actuator may be attached to shifting arm 750 or to connecting link 730. In normal (powered) usage, the linear actuator operatively shifts the linkage system into the appropriate position. If power fails the linear actuator, which would be frozen in place, may be decoupled or disconnected from shifting arm 750 or connecting link 730 and the user may then use shifting arm 750 directly to manually control the linkage system. The disconnection may be as simple as pulling out a pin that connects shifting arm 750 or connecting link 730 to the linear actuator. This manual back-up system may similarly be implemented and employed in the linkage system of FIG. 6, wherein the manual shifting system shown in FIG. 7A is added to the FIG. 6 chassis. The manual shifting system can be connected to the linkage system of FIG. 6 in the same manner as in FIG. 7, i.e. with the end 733 of connecting link 730 pivotably connected to a small extension 741 on the right front corner of drive assembly 20(*b*) on right drivewheel 6(*b*).

Figure 8:
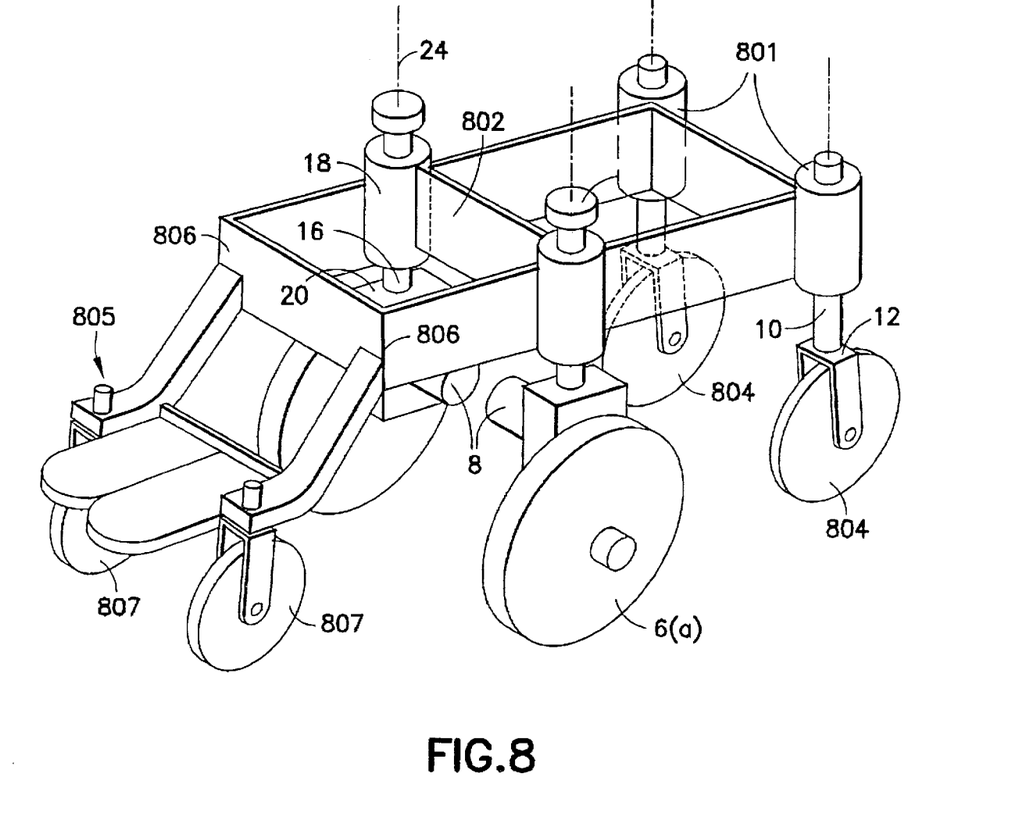
FIG. 8 is an elevated perspective view of the frame, wheels, and drive assemblies of a wheeled chassis constructed according to another preferred embodiment of the present invention.

FIG. 8 depicts another currently-preferred embodiment of the invention. Unlike the view of FIG. 4, the wheelchair chassis of FIG. 8 is shown from its front left corner so that the rear of the frame 2 faces the righthand side of the drawing (i.e. away from the viewer), and the front of the frame faces toward the left. In this embodiment, both of the drivewheels 6 are offset from the rear corners 801 of frame 2, in the illustrated arrangement so that channels 18 holding kingpins 16 are both offset by the same distance from their respective rear corners, and a transverse bar 802 connects the opposed channels 18. Although channels 18 in the FIG. 8 embodiment are located the same distance from their respective rear corners, they may alternatively be located at different distances, thus being offset from one another as in the FIG. 4 embodiment. Located at or proximate the rear corners of the frame are independently pivoting, free-spinning wheels 804 which may be similar to the wheels 4 located at the front of the FIG. 4 embodiment. A wheeled footrest 805 is shown connected to the front corners 806 of frame 2. Footrest wheels 807 are also independently pivoting and free-spinning.

Figure 9A:
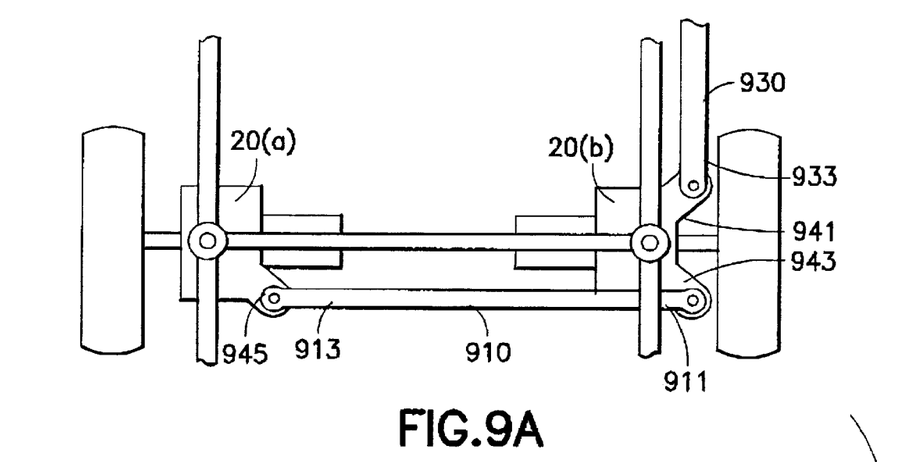
Figure 9B:
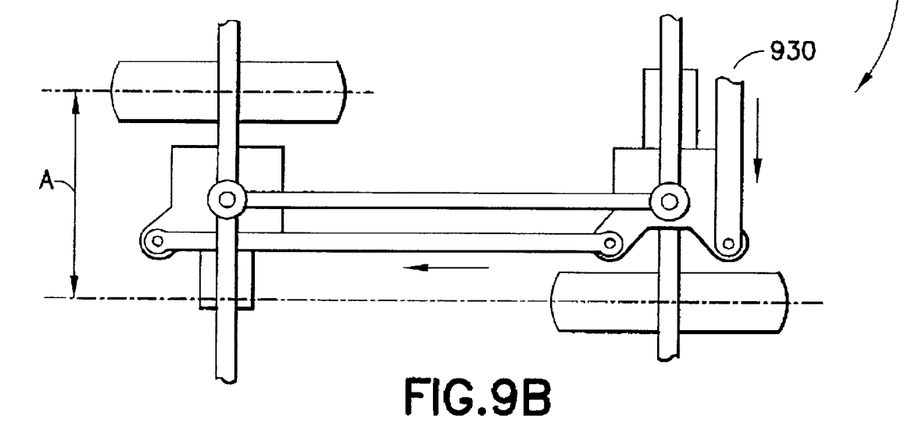

A linkage system, similar to that of FIGS. 7A and 7B, for orienting the drivewheels 6 of the FIG. 8 embodiment is shown in FIGS. 9A–9B, and may be manually, or alternatively, power operated with a manual backup. A transverse link 910, a connecting link 930, and a shifting arm (not shown)—which is configured and operates in a manner similar to the shifting arm of FIG. 7A—form the linkage system. Each end of transverse link 910 is pivotably connected, as at a corner, to a respective one of the drivewheel assemblies 20(*a*), 20(*b*). One of the drivewheel assemblies 20 is attached by connecting link 930 to the shifting arm and, when the shifting arm moves connecting link 930, the attached drivewheel assembly 20 is correspondingly moved, effecting movement of the connected transverse link 910 and causing movement of the opposite drivewheel assembly connected at the opposite end of transverse link 910. By this arrangement and operation, an operator selectively moving the shifting arm can rotate the drivewheels 6 into various different orientations.

End 933 of connecting link 930 is pivotably connected to a small extension 941 defined on the right front corner of drive assembly 20(*b*) of right drivewheel 6(*b*). Another small extension defined on the right rear corner of drive assembly 6(*b*) is pivotably connected to the right end 911 of transverse link 910. The left end 913 of transverse link 910 is pivotably connected to a small extension 945 defined on the right rear corner of drive assembly 6(*a*).

FIG. 9A shows the drivewheels 6 in the straight position, and FIG. 9B shows them in the lateral position. The embodiment of FIGS. 9A–9B does not require a rotation position for drivewheels 6 because rotation in place can be achieved simply by reversing the rotative direction of one of the drivewheels relative to the other while in the straight position (FIG. 9A). Lateral motion of the chassis frame along a supporting surface nevertheless still requires an offset between the two drivewheels, which is achieved by lateral position (FIG. 9B). To attain this orientation of the drivewheels 6, the shift arm is advanced to the furthest forward position, thus displacing connecting link 930 to its rearmost position and forcing extension 941 of drive assembly 6(*b*) rearward. Drive assembly 20(*b*) is thus rotated about substantially vertical axis 24 of kingpin 16 into the proper 90° rotative position. At the same time, transverse link 910 is moved to the left by the rotation of drive assembly 20(*b*), by which transverse link 910 forces extension 945 of drive assembly 20(*a*) to the left. Drive assembly 20(*a*) is thereby rotated about substantially vertical axis 23 of kingpin 16, rotating left drive wheel 6(*a*) into the proper 90° rotative position.

Thus, while there have shown and described and pointed out fundamental novel features of the invention as applied to preferred embodiments thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same result are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A wheeled chassis for powered multidirectional movement along an underlying support surface, comprising:
   a frame defining a front and a back and a locating axis extending from and between said front and said back of the frame;
   a free-spinning wheel rotatably attached proximate the front of said frame;
   first and second powered drivewheels each located proximate an opposite side of said frame rearwardly of said frame front and connected to said frame for rotative movement relative to said frame about a respective substantially vertical axis to vary an orientation of the each drivewheel and thereby enable movement of the wheeled chassis in a desired direction supported on the drivewheels and free-spinning wheel along the underlying support surface;
   said first and second powered drivewheels being offset relative to each other by a predetermined offset distance defined along said locating axis;
   a linkage connecting said first and second powered drivewheels, said linkage being moveable between a first position in which the first and second drivewheels are oriented in a first orientation for movement of the wheeled chassis in a first desired direction along the underlying ground surface, and a second position in which the first and second drivewheels are oriented in a second orientation for movement of the wheeled chassis in a second desired direction along the underlying ground surface, and said linkage being configured so that during said movement of the linkage between said first and second positions each of said first and second drivewheels rotates about its respective substantially vertical axis in an opposite rotational sense; and means connected to said linkage for selectively moving said linkage between said first and second positions of the linkage to thereby selectively vary the orientation of said first and second drivewheels and, thereby, the direction of movement of said chassis along the underling ground surface.

2. A wheeled chassis in accordance with claim 1, wherein said means comprises an actuator selectively moveable between a first position of the actuator in which said linkage is disposed in said first position of the linkage and a second position of the actuator in which said linkage is disposed in said second position of the linkage to thereby selectively vary, through selective movement of said actuator, the orientation of said first and second drivewheels and, thereby, the direction of movement of said chassis along the underlying ground surface.

3. A wheeled chassis in accordance with claim 1, wherein said actuator comprises an elongated actuator bar selectively movable between said first and second positions of said actuator by user-effected pivoted movement of said actuator bar.

4. A wheeled chassis in accordance with claim 1, wherein in moving between said first and second positions of said linkage said linkage moves through a third position of said linkage in which said first and second drivewheels are oriented in a third orientation rotationally intermediate said first and second orientations of said drivewheels for movement of the wheeled chassis in a third desired direction along the underlying ground surface.

5. A wheeled chassis in accordance with claim 1, wherein said linkage is configured so that, in said first position of said linkage, said first and second drivewheels are oriented for movement of the wheeled chassis along the underlying ground surface in a direction substantially parallel to said location axis, and in said second position of said linkage said first and second drivewheels are oriented for movement of the wheeled chassis along the underlying ground surface in a direction substantially transverse to said location axis.

6. A wheeled chassis in accordance with claim 4, wherein said linkage is configured so that, in said first position of said linkage, said first and second drivewheels are oriented for movement of the wheeled chassis along the underlying ground surface in a direction substantially parallel to said location axis, so that in said second position of said linkage said first and second drivewheels are oriented for movement of the wheeled chassis along the underlying ground surface in a direction substantially transverse to said location axis, and so that in said third position of said linkage said first and second drivewheels are oriented for in-place rotation of the wheeled chassis on the underlying ground surface.

7. A wheeled chassis in accordance with claim 1, wherein said means comprises a motor operable for moving said linkage between said first and second positions of said linkage.

8. A wheeled chassis in accordance with claim 1, wherein said linkage comprises:

a central link rotationally pivotable by said means about a pivot axis between a first pivot position of said central link in which said linkage is disposed in said first position of the linkage, and a second pivot position of said central link in which said linkage is disposed in said second position of the linkage;

a first linking bar connecting said central link to said first drivewheel for effecting concurrent rotative reorientation of the first drivewheel and pivoted rotation of said central link; and a second linking bar connecting said central link to said second drivewheel for effecting concurrent rotative reorientation of the second drivewheel and pivoted rotation of said central link.

9. A wheeled chassis in accordance with claim 8, wherein said central link comprises an elongated bar having opposite ends, said first linking bar is connected to said central link proximate one of said opposite ends, said second linking bar is connected to said central link proximate the other of said opposite ends, and said pivoted axis is located intermediate said opposite ends.

10. A wheeled chassis in accordance with claim 1, wherein said linkage comprises a first linkage bar connecting said first and second drivewheels and a second linkage bar connecting said first and second drivewheels, and wherein said means comprises an elongated actuator connected to said linkage at one of said drivewheels and connected to said frame for pivoted movement between a first position of the actuator in which said linkage is disposed in said first position of the linkage and a second position of the actuator in which said linkage is disposed in said second position of the linkage to thereby selectively vary, through selective movement of said actuator, the orientation of said first and second drivewheels and, thereby, the direction of movement of said chassis along the underlying ground surface.

11. A wheeled chassis in accordance with claim 10, wherein said means further comprises powered means connected to said elongated actuator and operable to move said actuator between said first and second positions of said actuator.

12. A wheeled chassis in accordance with claim 11, wherein said powered means comprises a linear actuator.

13. A wheeled chassis in accordance with claim 11, wherein the connection between said elongated actuator and said powered means comprises a selectively detachable connection so as to enable, when said powered means is disconnected from said elongated actuator, user-controlled manual movement of the actuator between said first and second positions of the actuator to thereby selectively move said linkage and vary the orientation of said first and second drivewheels for selectively changing, under the manual control of the user, the direction of movement of said chassis along the underlying ground surface.

14. A wheeled chassis in accordance with claim 1, wherein said first drivewheel is disposed proximate the back of said frame along one of the frame sides and said second drivewheel is disposed said offset distance from the back of said frame along the other of said frame sides.

15. A wheeled chassis having independently pivotable drivewheels for multidirectional motion, comprising:

a substantially rectangular frame having front, rear, first, and second sides;

at least one free-spinning wheel rotatably attached proximate the front side of said frame;

a rear drivewheel attached at a location; on the first side of said frame by a kingpin, said kingpin being secured in a vertical channel located at the first side location and having a substantially vertical axis about which the rear drivewheel may rotate to a vary an orientation of the rear drivewheel; and an offset drivewheel attached to the frame at a location on the second side of said frame by a kingpin, said kingpin being secured in a vertical channel located at the second side location and having a substantially vertical axis about which the offset drivewheel may rotate, wherein a distance of the second side location from the front side of said frame is less than a distance of the first side location from the front side of said frame to define an offset distance as the difference between said second and first side distances;

wherein the orientations of the rear and offset drivewheels determine a direction of movement of the wheeled chassis on and above an underlying ground surface and the offset distance between the drivewheels provides stability, control and efficiency to movements of the wheeled chassis on and along the ground surface.

16. The wheeled chassis as recited in claim 15, further comprising a seat on said frame for accommodating a user of said chassis as a wheelchair.

17. The wheeled chassis as recited in claim 15, further comprising rear and offset drive means operatively connected to the rear and offset drivewheels, respectively, for moving the wheeled chassis in a determined direction of movement.

18. The wheeled chassis as recited in claim 15, further comprising rear and offset drive gears formed at the top of the kingpins of the rear and offset drivewheels, respectively, for rotating the respective kingpins, and, thus, the respective drivewheels into different orientations.

19. The wheeled chassis as recited in claim 18, further comprising a linkage system attached to the rear and offset drive gears for moving the drivewheels into different orientations.

20. The wheeled chassis as recited in claim 19, wherein the linkage system comprises:

a rear drive gear link having a mounted end and a pivoting end, said mounted end securely connected to the rear drive gear;

a rear drive transverse link having outer and inner pivoting ends, said outer pivoting end pivotably connected to the pivoting end of the rear drive gear link;

a control link having a mounted centerpoint, a rear drivewheel end, and an offset drivewheel end, said mounted centerpoint pivotably connected to the rear side of the frame, said real drivewheel end pivotably connected to the inner pivoting end of the rear drive transfer link;

an offset drive transverse link having outer and inner pivoting ends, said inner pivoting end pivotably connected to the offset drivewheel end of the control link; and an offset drive gear link having a mounted end and a pivoting end, said pivoting end connected to the outer pivoting end of the offset drive transfer link, and said mounted end securely connected to the offset drive gear;

wherein said control link rotates around its mounted centerpoint, thus moving the transverse links and the drive gear links, whose secure mounted connection to the respective drive gears causes the the respective kingpins to rotate the respective drivewheels into different orientations.

21. The wheeled chassis as recited in claim 20, wherein the linkage system further comprises:

one of a motor and an actuator for rotating the control link around its mounted centerpoint;

at least one switch for turning off said one of a motor and an actuator when the control link is rotated to a position corresponding to an orientation position of the drivewheels; and at least one switch for turning off said one of a motor and an actuator when the control link is rotated to a position corresponding to a limit of desired orientations of the drivewheels.

22. The wheeled chassis as recited in claim 19, further comprising:

a rear drivewheel assembly comprising an axle of the rear drivewheel and connecting the rear drivewheel to the rear drivewheel kingpin; and an offset drivewheel assembly comprising an axle of the offset drivewheel and connecting the offset drivewheel to the offset drivewheel kingpin.

23. The wheeled chassis as recited in claim 22, wherein the linkage system comprises:

a connecting link having a shift control end and an offset drivewheel assembly end, said connecting link having extension parallel to the second side of the frame, said shift control end connected to a shifting means, said offset drivewheel assembly end pivotably connected to the offset drivewheel assembly; and a transverse link having an offset drivewheel assembly end and a rear drivewheel assembly end, said offset drivewheel assembly end pivotably connected to the offset drivewheel assembly, said rear drivewheel assembly end pivotably connected to the rear drivewheel assembly;

wherein the shifting means moves the connecting link along its extension such that the offset assembly is rotated around the substantially vertical axis of the offset drivewheel kingpin and said offset drivewheel assembly rotation moves the transverse link, thus causing the rear drivewheel assembly to rotate around the substantially vertical axis of the rear drivewheel kingpin.

24. The wheeled chassis as recited in claim 23, wherein the shifting means comprises one of a motor and an actuator.

25. The wheeled chassis as recited in claim 23, wherein the shifting means comprises:

a shifting arm having a lever end, a fulcrum point, and a connected end, said shifting arm for shifting the positions of the connecting link, said fulcrum point pivotably connected to the second side of the frame such that the shifting arm rotates around said fulcrum point in a fulcrum plane, said connected end pivotably connected to the shift control end of the connecting link such that the shifting arm and the connecting link pivot in the fulcrum plane;

wherein moving the lever end of the shifting arm in the fulcrum plane rotates the shifting arm such that the connecting end of the shifting arm moves the connecting link along its extension.

26. The wheeled chassis as recited in claim 15, wherein the first side location of the vertical channel for the kingpin of the rear drivewheel is located proximate a corner of the first and rear sides of the frame.

27. The wheeled chassis as recited in claim 15, wherein the first side location of the vertical channel for the kingpin of the rear drivewheel is located a rear drivewheel distance away from a corner of the first and rear sides of the frame.

* * * * *